Patented Mar. 12, 1940

2,193,151

UNITED STATES PATENT OFFICE 2,193,151

ACID WOOL DYESTUFFS OF THE ANTHRAQUINONE SERIES

Werner Zerweck and Ernst Heinrich, Frankfort-on-the-Main-Fechenheim, Germany, assignors to General Aniline & Film Corporation, a corporation of Delaware No Drawing. Application November 4, 1937, Serial No. 172,748. In Germany November 12, 1936

3 Claims. (Cl. 260—372)

Our present invention relates to "acid wool dyestuffs of the anthraquinone series" more particularly to those of the general formula:

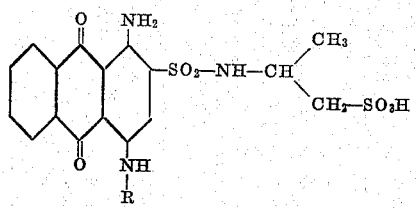

wherein R stands for a radicle of the benzene series.

The new dyestuffs are obtainable by condensing 1-amino-4-halogenoanthraquinone-2-sulfonic acid chlorides with the 2-aminopropane-2-sulfonic acid and acting on the sulfamide thus obtained with an aromatic amine in the presence of an acidbinding agent. Or one may convert an 1-amino-4-arylido-anthraquinone-2-sulfonic acid into the sulfochloride and condense the latter with the 2-aminopropane-2-sulfonic acid.

The present new dyestuffs dye the animal fibers from an acid bath bluish shades of a good fastness.

In order to further illustrate our invention the following examples are given, the parts being by weight and all temperatures in degrees Centigrade.

Example

To a solution of 54 parts of 1-amino-4-bromanthraquinone-2-sulfochloride in a mixture of 450 parts of dioxane and 150 parts of alcohol, a solution of the sodium salt of 54 parts of 2-aminopropane-3-sulfonic acid in about 160 parts of water is added and the mixture is stirred for some hours. The precipitated sulfamide of the formula:

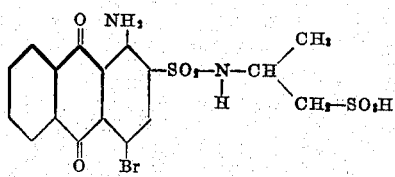

may be purified by redissolving it in water. It crystallizes from water as reddish orange needles, which are easily soluble in water.

10 parts thereof are dissolved in 1000 parts of water and 12 parts of aniline, 5 parts of sodium bicarbonate and 1 part of cuprous chloride are added. The solution is heated for some hours at 90 to 95°. The new dyestuff, which may be isolated as described in the foregoing example of the formula:

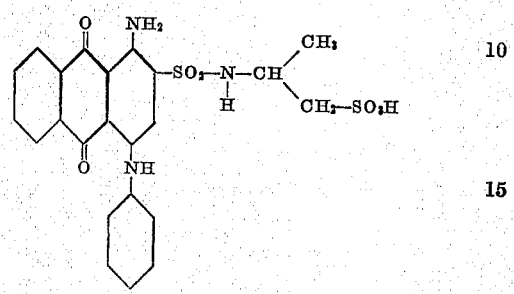

dyes wool from an acid bath pure and fast blue shades of a good levelling power.

The same dyestuff is obtained by converting the 1-amino-4-anilido-anthraquinone-2-sulfonic acid into its sulfo chloride and acting thereupon with 2-aminopropane-3-sulfonic acid.

When replacing the above 12 parts of aniline by 20 parts of acetyl-p-phenylenediamine, a dyestuff of a greenish blue shade is obtained. When using as final reaction component acetyl-m-phenylene diamine, p-amino-methylacetanilide or cyclohexylamine, similar dyestuffs of reddish blue shades are obtained.

We claim:

1. Acid wool dyestuffs of the anthraquinone series of the general formula:

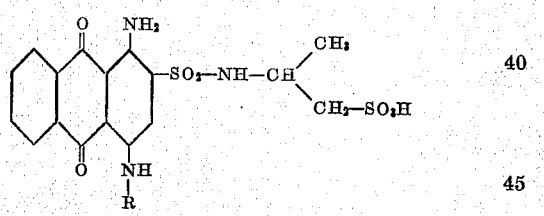

wherein R stands for a radicle of the benzene series, which dyestuffs dye animal fibers from an acid bath bluish shades of a good fastness.

2. An acid wool dyestuff of the anthraquinone series of the formula:
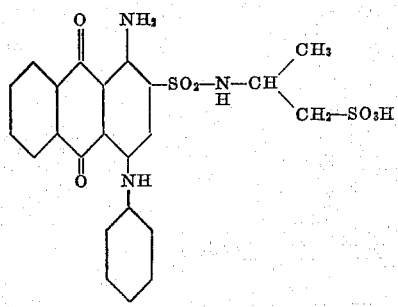
which dyestuff dyes wool from an acid bath pure and fast blue shades of a good levelling power.
3. An acid wool dyestuff of the anthraquinone series of the formula:
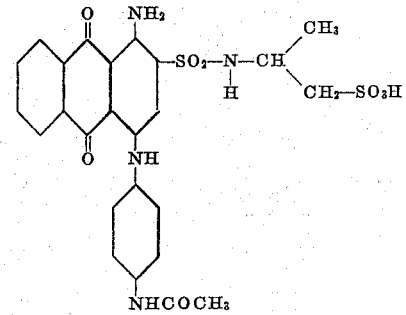
which dyestuff dyes wool from an acid bath pure and fast greenish blue shades of a good levelling power.
WERNER ZERWECK.
ERNST HEINRICH.